US012601711B2

(12) United States Patent
Miyake et al.

(10) Patent No.: US 12,601,711 B2
(45) Date of Patent: Apr. 14, 2026

(54) AUTOMATED ANALYSIS APPARATUS

(71) Applicant: HITACHI HIGH-TECH CORPORATION, Tokyo (JP)

(72) Inventors: Masafumi Miyake, Tokyo (JP); Takushi Miyakawa, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1071 days.

(21) Appl. No.: 17/274,450

(22) PCT Filed: Dec. 3, 2019

(86) PCT No.: PCT/JP2019/047110
§ 371 (c)(1),
(2) Date: Mar. 9, 2021

(87) PCT Pub. No.: WO2020/116410
PCT Pub. Date: Jun. 11, 2020

(65) Prior Publication Data
US 2022/0026387 A1      Jan. 27, 2022

(30) Foreign Application Priority Data
Dec. 6, 2018    (JP) ................................. 2018-228622

(51) Int. Cl.
*G01N 27/416*        (2006.01)
*G01N 27/333*        (2006.01)
*G01N 35/08*         (2006.01)
(52) U.S. Cl.
CPC ......... *G01N 27/416* (2013.01); *G01N 27/333* (2013.01); *G01N 35/08* (2013.01)

(58) Field of Classification Search
CPC .... G01N 27/416; G01N 27/333; G01N 35/08; G01N 33/48707; G01N 35/10;
(Continued)

(56) References Cited

U.S. PATENT DOCUMENTS

| | | |
|---|---|---|
| 4,641,249 A | 2/1987 | Gion et al. |
| 2006/0104827 A1 | 5/2006 | Shaw et al. |
| 2016/0341692 A1* | 11/2016 | Tonomura ............ G01N 27/283 |

FOREIGN PATENT DOCUMENTS

| | | |
|---|---|---|
| EP | 0 417 968 A1 | 3/1991 |
| JP | 54-43794 A | 4/1979 |

(Continued)

OTHER PUBLICATIONS

Kimura et al., English translation of JPS6228658A, 1987 (Year: 1987).*

(Continued)

*Primary Examiner* — James Lin
*Assistant Examiner* — Sommer Yousef Osman
(74) *Attorney, Agent, or Firm* — MATTINGLY & MALUR, PC

(57)        ABSTRACT

The purpose of the present invention is to provide an automated analysis apparatus that can reduce the influence of a pre-sample more reliably, by delivering an internal standard solution. The automated analyzing apparatus according to the present invention determines in advance whether the ion concentration of a first sample is higher than the ion concentration of a second sample by a reference value, and delivers a liquid other than the sample in addition to the internal standard solution (see FIG. 2)

3 Claims, 7 Drawing Sheets

(58) Field of Classification Search
CPC ............. G01N 27/4163; G01N 33/492; G01N
33/493; G01N 2035/0437; G01N
2035/1032; G01N 35/00613; G01N
2035/00277
See application file for complete search history.

(56) References Cited

FOREIGN PATENT DOCUMENTS

| | | | | | |
|----|----|----|----|----|----|
| JP | 57-67851 | A | | 4/1982 | |
| JP | 57-132240 | U | | 8/1982 | |
| JP | 60-225056 | A | | 11/1985 | |
| JP | 62-28658 | A | | 2/1987 | |
| JP | S6228658 | A | * | 2/1987 | ............. G01N 27/26 |
| JP | 62-66155 | A | | 3/1987 | |
| JP | 3-100455 | A | | 4/1991 | |
| JP | 03-108652 | A | | 5/1991 | |
| JP | 6-43133 | A | | 2/1994 | |
| JP | 2006-153623 | A | | 6/2006 | |
| JP | 2010-175275 | A | | 8/2010 | |
| JP | 2013-024799 | A | | 2/2013 | |

OTHER PUBLICATIONS

Extended European Search Report received in corresponding European Application No. 19894142.9 dated Jul. 26, 2022.
Japanese Office Action received in corresponding Japanese Application No. 2022-082028 dated Apr. 11, 2023.
International Search Report of PCT/JP2019/047110 dated Feb. 10, 2021.
Japanese Office Action received in corresponding Japanese Application No. 2022-082028 dated Oct. 15, 2024.

* cited by examiner

AUTOMATED ANALYSIS APPARATUS

TECHNICAL FIELD

The present invention relates to an automatic analysis device.

BACKGROUND ART

In a flow type electrolyte analyzer, an internal standard solution may be measured between one specimen measurement and the next specimen measurement using an ion selective electrode (hereinafter, referred to as "ISE") (refer to PTL 1). In PTL 1, an internal standard solution having a known ion concentration is supplied between the sample measurement and the next sample measurement to clean away a pre-specimen component in a flow path, and an electromotive force of the internal standard solution is measured to calculate a difference between the electromotive force of the specimen and the electromotive force of the internal standard solution. With the internal standard solution measurement, the influence of the pre-specimen can be reduced, and the drift of an ISE electrode potential can be corrected.

CITATION LIST

Patent Literature

PTL 1: JP-A-2013-024799

SUMMARY OF INVENTION

Technical Problem

When a high-concentration urine specimen having a higher concentration than a serum or plasma specimen is measured before measuring an internal standard solution, or when it is difficult to clean away a specimen due to high viscosity of the specimen by supplying the internal standard solution, the internal standard solution measurement value as a reference varies due to the influence of a pre-sample, which may lead to a variation in corrected concentration. In this case, it is difficult to completely remove the influence of the pre-specimen with the method described in PTL 1.

An object of the present invention is to provide an automatic analysis device capable of reducing the influence of a pre-specimen more reliably by supplying an internal standard solution.

Solution to Problem

In the automatic analysis device according to the present invention, when the ion concentration of a first specimen is greater than the ion concentration of a second specimen by a reference value or greater, a liquid other than the specimen is supplied in addition to an internal standard solution.

ADVANTAGEOUS EFFECTS OF INVENTION

According to the present invention, when a plurality of specimens having unknown concentrations are continuously measured, the influence of a high-concentration specimen on the next specimen can be reduced. In addition, when the influence of a pre-specimen is small, an internal standard solution is not supplied more than necessary. Therefore, the influence on the processing capacity can be minimized.

DESCRIPTION OF EMBODIMENTS

First Embodiment

Figure 1:
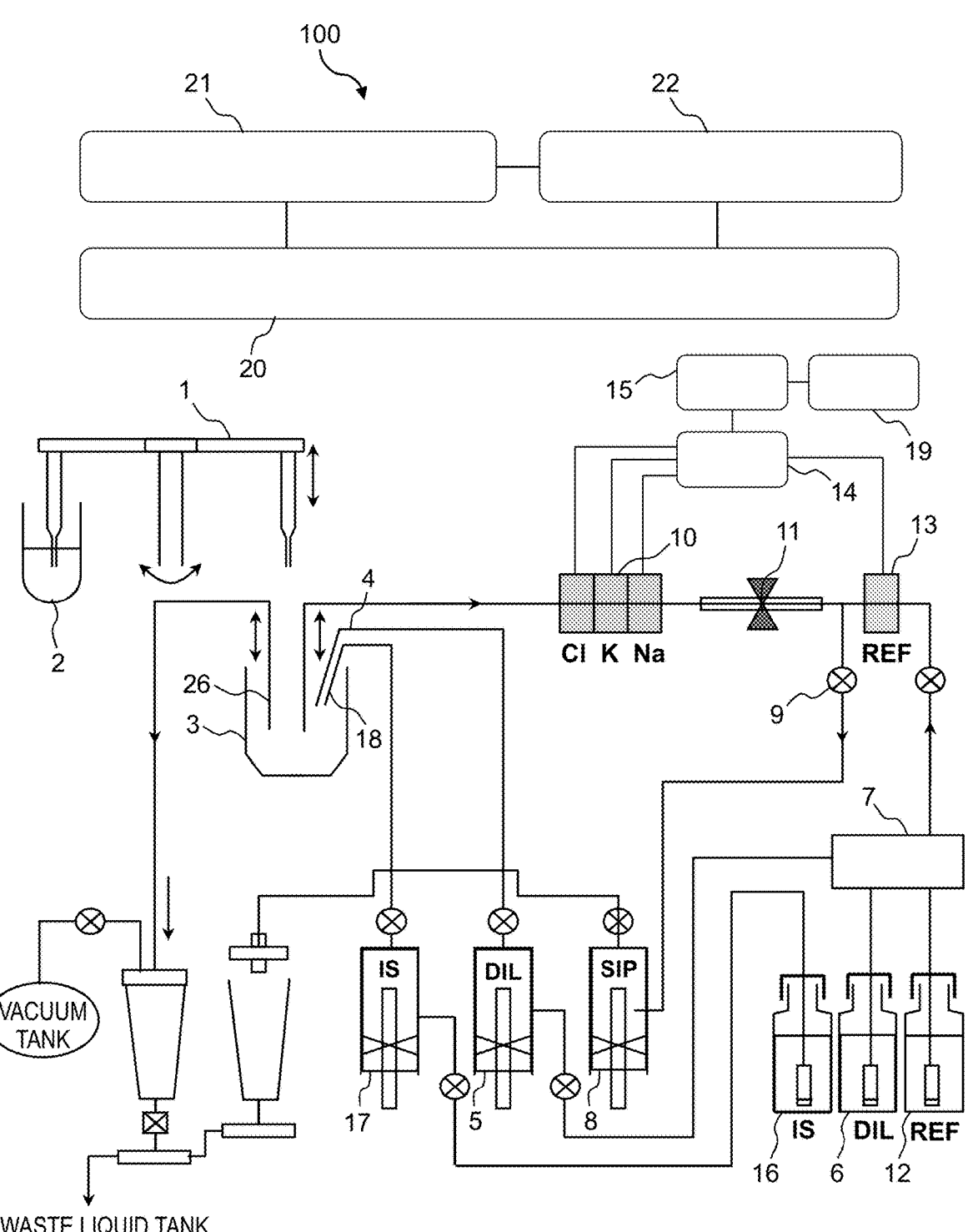
FIG. 1 is a configuration diagram of an automatic analysis device 100 according to a first embodiment.

FIG. 1 is a configuration diagram of an automatic analysis device 100 according to a first embodiment. The automatic analysis device 100 is configured as a flow type electrolyte analyzer. A sample probe 1 dispenses a sample from a sample container 2 and discharges the sample into a dilution tank 3. After dispensing the sample into the dilution tank 3, a diluent is supplied from a dilution bottle 6 through the operation of a diluent syringe 5. A dilution nozzle 4 discharges the diluent to dilute a specimen. In order to prevent the formation of bubbles caused by a change in the temperature or pressure of the diluent in a flow path, the specimen is degassed by a degassing mechanism 7 attached to an intermediate portion in the diluent flow path. The diluted specimen is aspirated to an ISE electrode 10 through the operation of a sipper syringe 8 and an electromagnetic valve 9. A reference electrode solution is supplied from a reference electrode solution bottle 12 into a reference electrode 13 through the operation of a pinch valve 11 and the sipper syringe 8. The reference electrode solution is formed of a potassium chloride (KCl) aqueous solution having a predetermined concentration, and the ISE electrode 10 and the reference electrode 13 are electrically connected by brining a sample into contact with the reference electrode. A voltmeter 14 and an amplifier 15 measures a variation in ISE electrode potential based on the reference electrode potential. Before and after sample measurement, an internal standard solution in an internal standard solution bottle 16 is supplied using an internal standard solution syringe 17 and is discharged from an internal standard solution nozzle 18 into the dilution tank 3. The ion concentration of the internal standard solution is measured through the same operation as the sample measurement.

A calculator 19 calculates the electrolyte concentration included in the sample using a difference between the electromotive force of the internal standard solution and the electromotive force of the sample. A control unit 20 controls the operations of the respective units included in the automatic analysis device 100. A computer 21 transmits an instruction to the control unit 20, for example, from a user. A storage unit 22 stores the result calculated by the calculator 19. The calculator 19, the control unit 20, and the computer 21 can also be integrally configured with one arithmetic device or the like. In this case, this arithmetic device can be considered as a control unit that controls the entire automatic analysis device 100. The control unit 20 can also be configured with hardware such as a circuit device that implements the operation. The control unit 20 can also be configured by an arithmetic device executing software that implements the operation. The same can be applied to a case where the calculator 19 and the computer 21 are integrated.

It is desirable that the concentration of the reference electrode solution is high in order to suppress the influence of a variation in concentration while the reference electrode solution is in contact with the sample. On the other hand, however, a high concentration near the saturated concentration may cause crystalized flow path clogging. Therefore, the concentration of the reference electrode solution is desirably in a range of 0.5 mmol/L to 2.0 mmol/L.

It is desirable to set the electrolyte concentration in the internal standard solution to be near an expected value of the electrolyte concentration in the sample. When a serum or plasma specimen is measured, it is desirable that Na: about 130 to 150 mmol/L, K: about 3 to 5 mmol/L, and Cl: about 90 to 110 mmol/L. The internal standard solution concentration can be selected depending on conditions such as the specimen type of a measurement target or the dilution degree.

The number of times of measurement of the internal standard solution can be increased or decreased based on a difference between the ion concentration of a specimen 1 and the ion concentration of a specimen 2 or based on a difference between the ion concentration of the specimen 1 and the ion concentration of the internal standard solution.

It is desirable that the supply amount of the internal standard solution is great from the viewpoint of the effect of cleaning away the specimen 1. From the viewpoint of acquiring the reference potential of the specimen 1 and the specimen 2, it is desirable that the operation cycle times for the specimen 1, the specimen 2, and the internal standard solution are the same. That is, it is desirable that the supply amount of the diluted specimen 1 is the same as the supply amount of the specimen 2. In the first embodiment, 15 μL of the specimen 1 is diluted with 450 μL of the diluent to prepare 465 μL of a diluted specimen in the dilution tank 3, and the diluted specimen is supplied to the ISE electrode 10 at about 250 μL to 450 μL. Therefore, the internal standard solution is supplied at about 250 μL to 700 μL.

After the measurement of the specimen 1, the internal standard solution (hereinafter, abbreviated as IS, ISa, ISb, or the like) is measured once, and then specimen 2 is measured. In this case, the degree of the influence of the specimen 1 on the internal standard solution will be described. It is assumed that, when ISa is supplied and measured after measuring the specimen 1, the specimen 1 remains on the flow path and the proportion (hereinafter, referred to as "residual rate") of the amount of the specimen 1 having the influence on the measurement result of ISa is X %. When ISa is measured after measuring 100 mmol/L of the specimen 1, the degree of influence of the specimen 1 on ISa is (100×X/100) mmol/L. Typically, the minimum resolution of the potassium concentration in serum or plasma is required to be about 0.1 mmol/L. Therefore, when the residual rate X=0.1% or higher, the influence is at a level where the required accuracy cannot be achieved.

Next, according to flows shown in FIG. 2 described below, the internal standard solution is supplied twice (for convenience of description, distinguished as ISa and ISb) after measuring the specimen 1. In this case, the degree of the influence of the specimen 1 on the ISb measurement result will be described. In this case, the degree of the influence of the specimen 1 is $((100 \times X/100) \times X/100) = 100 \times X^{2}/10000$. Accordingly, in order to realize the minimum resolution of 0.1 mmol/L, it is necessary that the residual rate $X=10^{1/2}=3.16\%$ or less. That is, according to the flows shown in FIG. 2 described below, the influence of the specimen 1 can be reduced more reliably.

Hereinafter, a case where a serum specimen or a plasma specimen as the second specimen that has a narrow concentration range and requires high accuracy measurement is continuously measured after measuring a urine specimen as the first specimen in which the electrolyte concentration is likely to be high will be described. The urine specimen has a wider concentration range than serum or plasma, and the concentration of urine collected for 24 hours may be about Na: 20 to 300 mmol/L, K: 1 to 100 mmol/L, and Cl: 20 to 300 mmol/L. On the other hand, the serum specimen or the plasma specimen has a narrow concentration range but is more important on the clinical test. Therefore, the serum specimen or the plasma specimen requires high-accuracy measurement. In general, the electrolyte concentration in the serum or plasma of a healthy subject is about Na: 136 to 146 mmol/L, K: 3.6 to 4.9 mmol/L, and Cl: 98 to 100 mmol/L. Accordingly, when the second specimen is continuously measured after measuring the first specimen, the measurement value of the second specimen may vary due to the influence of the first specimen.

Figure 2:
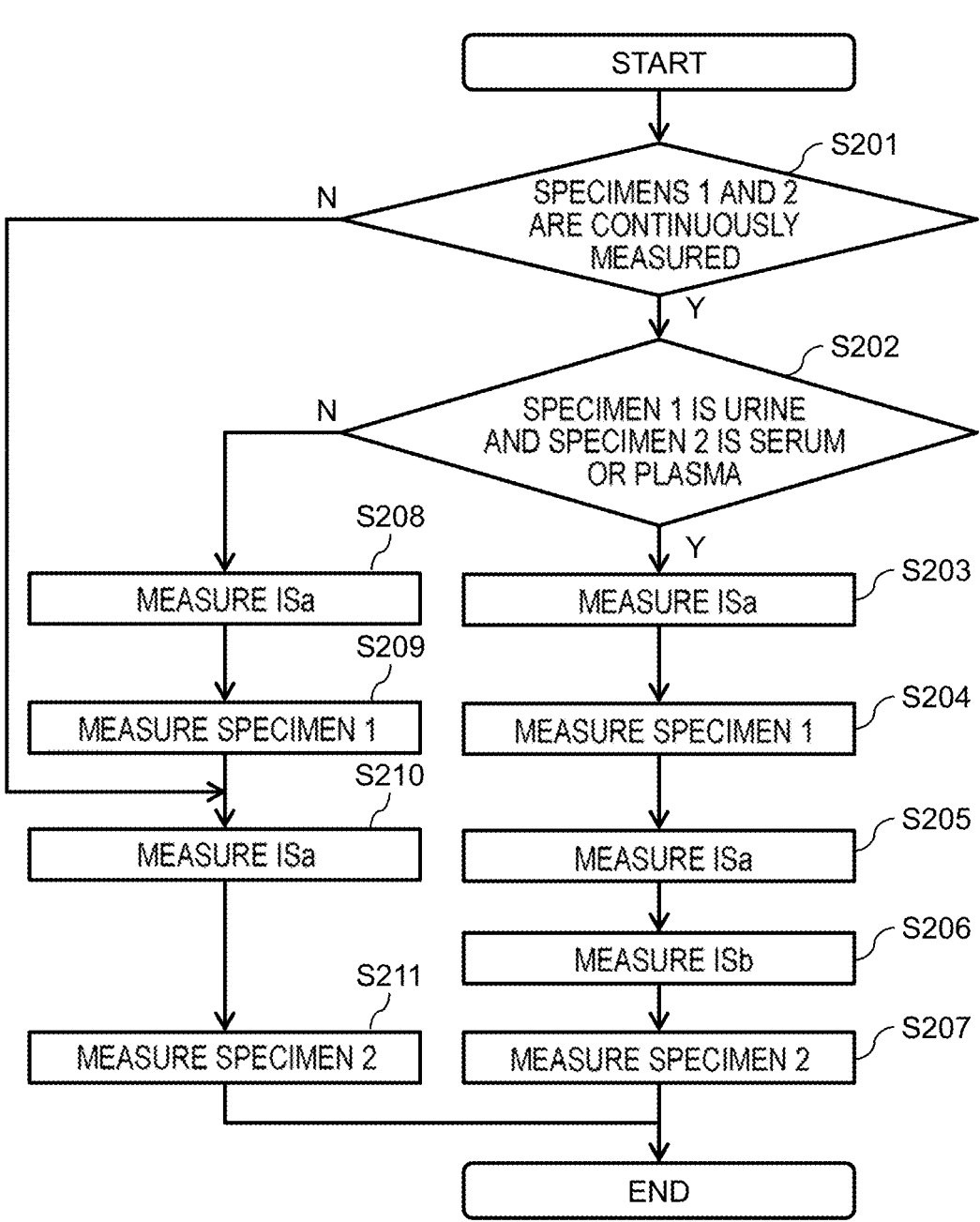
FIG. 2 is a flow chart illustrating an operation procedure of the automatic analysis device 100.

FIG. 2 is a flow chart illustrating an operation procedure of the automatic analysis device 100. In the automatic analysis device 100, when the first specimen is highly likely to have the influence on the measurement value of the second specimen, the influence is suppressed according to the procedure of FIG. 2. When an operator inputs the type, the number, the measurement order, or the like of the specimen to the automatic analysis device 100, the automatic analysis device 100 starts this flow chart. Hereinafter, for convenience of description, it is assumed that the control unit 20 also functions as the calculator 19 and the computer 21. Hereinafter, each of steps in FIG. 2 will be described. Hereinafter, for example, Step 201 will be referred to as S201.

(FIG. 2: S201)

The control unit 20 determines whether or not the second specimen is continuously measured after measuring the first specimen. This determination can be made, for example, according to an instruction from an operator. When the second specimen is continuously measured, the process proceeds to S202. When the second specimen is not continuously measured, the process skips to S208. FIG. 2 illustrates an example where only the second specimen is measured by skipping the process to S210. However, according to an instruction from an operator, this flow chart may end after measuring only ISa and the first specimen.

(FIG. 2: S202)

The control unit 20 determines whether or not the first specimen is urine and the second specimen is serum or plasma. This determination can be made, for example, according to an instruction from an operator. As described above, the concentration range of urine is wide. Therefore, the concentration range of urine is low and may have little influence on the measurement result of the second specimen. However, here, when the first specimen is urine and the second specimen is serum or plasma, the process proceeds to S203 irrespective of the actual concentration difference. Otherwise, the process proceeds to 5208.

(FIGS. 2: S203 to S204)

The control unit 20 supplies the internal standard solution ISa to the ISE electrode 10 and measures the electrolyte concentration (S203). Next, the control unit 20 supplies the first specimen to the ISE electrode 10 and measures the electrolyte concentration (S204).

(FIGS. 2: S205 to S207)

The control unit 20 supplies the internal standard solution ISa to the ISE electrode 10 and measures the electrolyte concentration (S205). Next, the control unit 20 supplies the internal standard solution ISb to the ISE electrode 10 and measures the electrolyte concentration (S206). Next, the control unit 20 supplies the second specimen to the ISE electrode 10 and measures the electrolyte concentration (S207). As the internal standard solutions ISa and ISb, the same solution may be repeatedly used. The internal standard solution is supplied twice before supplying the second specimen. Therefore, the first specimen remaining on the flow path is cleaned away, and the influence of the first specimen can be reduced more reliably.

(FIGS. 2: S208 to S211)

As in S203 to S207, the control unit 20 executes the ISa measurement (S208), the first specimen measurement (S209), the ISa measurement (S210), and the second specimen measurement (S211). In this case, the internal standard solution is supplied only once between S209 and S211. The reason for this is that the control unit 20 determines that the first specimen has little influence on the measurement result of the second specimen in 5202. This way, only when the urine specimen (the first specimen) and the serum specimen or plasma specimen (the second specimen) are continuously measured, the internal standard solution is supplied twice and measured. As a result, a decrease in measurement throughput can be minimized.

Figures 3, 4:
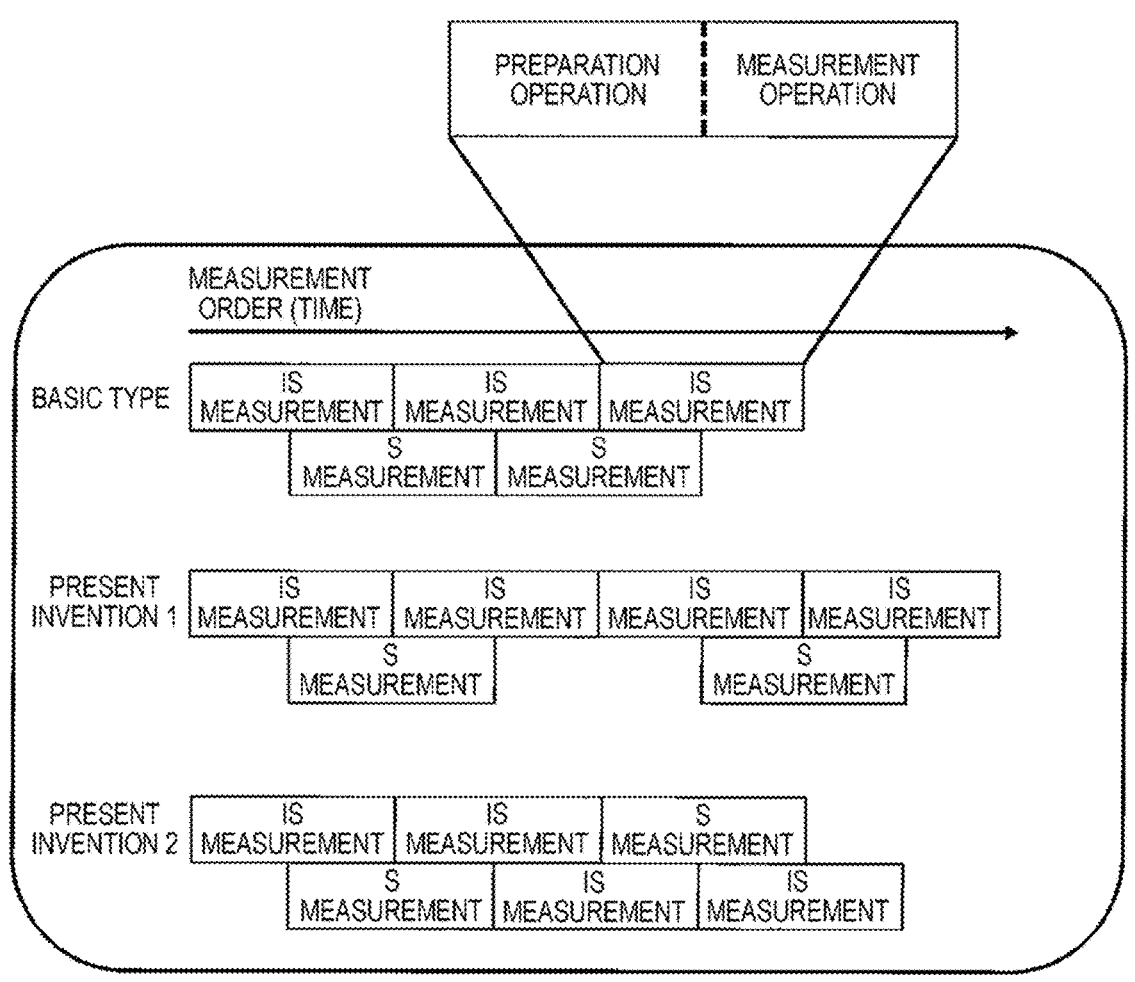
FIG. 3 is a diagram schematically illustrating a measurement sequence of the automatic analysis device 100.
FIG. 4 is a sequence example when specimen measurement and internal standard solution measurement are executed in parallel.

FIG. 3 is a diagram schematically illustrating a measurement sequence of the automatic analysis device 100. As the simplest measurement sequence example, an example where the sample (S) and the internal standard solution (IS) are measured in order (serially) as shown in FIG. 3 can be considered. In this case, as illustrated in FIG. 2, the IS measurement is executed twice after measuring the urine specimen. Therefore, the measurement completion time is extended by one cycle as compared to the measurement sequence in the related art.

FIG. 4 is a sequence example when the specimen measurement and the internal standard solution measurement are executed in parallel. One cycle (the respective steps after S203 in FIG. 2) in which the automatic analysis device 100 measures the electrolyte concentration can be divided into a preparation operation and a measurement operation. The preparation operation is an operation of preparing a liquid for allowing the ISE electrode 10 to measure the electromotive force, in which a liquid to be measured in the dilution tank 3 is prepared through the operation of each of dispensing mechanisms, a waste liquid aspiration nozzle 26, or the like. The measurement operation is an operation of supplying a measurement target liquid to the ISE electrode 10 to measure the electromotive force. The preparation operation and the measurement operation are different in operation positions, and thus can be executed independently from each other. Accordingly, in order to reduce the measurement time, the operations can be executed in parallel, for example, the preparation operation for the ISa is executed while the measurement operation for the first specimen is executed.

As illustrated in FIG. 2, in the first embodiment, it is necessary to measure the internal standard solution twice before measuring the serum specimen or plasma specimen and after measuring the urine specimen. At this time, as indicated by "Present invention 1" in FIG. 4, the preparation operation for the first IS can be executed while the measurement operation for the sample is executed. As a result, the measurement completion time can be reduced as compared FIG. 3.

Further, as indicated by "Present invention 2" in FIG. 4, the preparation operation for the second IS can be executed while the measurement operation for the first IS is executed. As a result, the measurement completion time can be further reduced as compared to "Present Invention 1". As a result, even when the internal standard solution is measured twice, the measurement completion time is extended by only 0.5 cycles as compared to the measurement sequence of the related art.

First Embodiment: Conclusion

In the automatic analysis device 100 according to the first embodiment, when the first specimen is urine and the second specimen is serum or plasma, the internal standard solution is measured twice before measuring the second specimen. As a result, the influence of the first specimen on the measurement result of the second specimen can be reduced reliably. In addition, even when the first specimen is urine and the concentration thereof is low, the process can be made simple without changing the process.

In the automatic analysis device 100 according to the first embodiment, the preparation operation for the internal standard solution is executed while the measurement operation for the first specimen is executed. As a result, when a plurality of specimens are measured, the measurement completion time can be reduced.

In the automatic analysis device 100 according to the first embodiment, when the internal standard solution is measured twice before the first specimen measurement and the second specimen measurement, the preparation operation for the second internal standard solution is executed while the measurement operation for the first internal standard solution is executed. As a result, even when the internal standard solution is measured twice in order to suppress the influence of the first specimen, the extension of the measurement completion time can be minimized.

Second Embodiment

Figure 5:
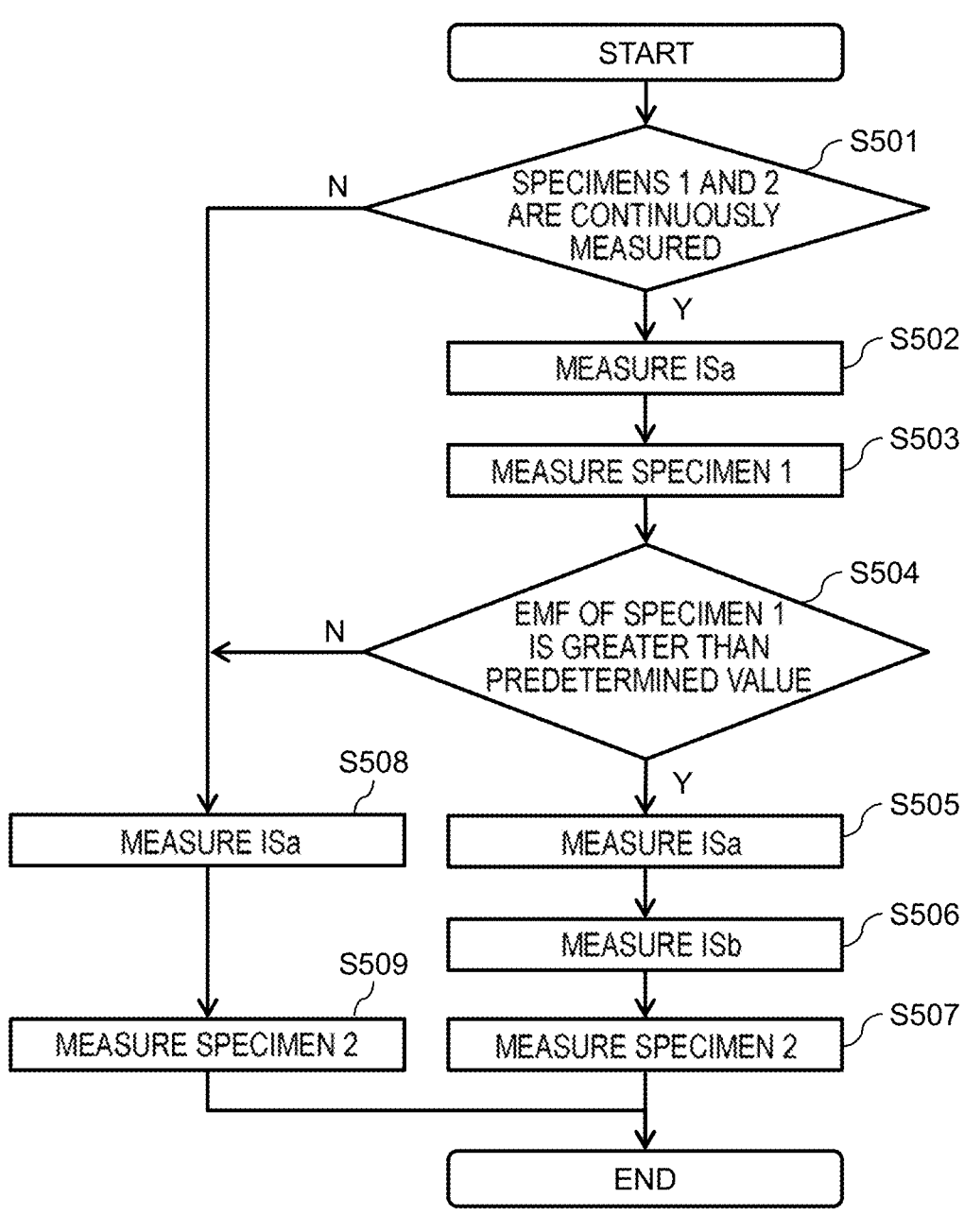
FIG. 5 is a flow chart illustrating an operation procedure of the automatic analysis device 100 according to a second embodiment.

FIG. 5 is a flow chart illustrating an operation procedure of the automatic analysis device 100 according to the second embodiment. The second embodiment is different from the first embodiment except for the method of determining whether or not the first specimen has a large influence on the measurement result of the second specimen. The configuration of the automatic analysis device 100 is the same as that of the first embodiment. Hereinafter, each of steps in FIG. 5 will be described.

(FIGS. 5: S501 to S503)

As in S201, the control unit 20 determines whether or not the second specimen is continuously measured after measuring the first specimen (S501). When the continuous measurement is executed, the control unit 20 supplies the internal standard solution ISa to the ISE electrode 10 and measures the electrolyte concentration (S502). Next, the control unit 20 supplies the first specimen to the ISE electrode 10 and measures the electrolyte concentration (S503). When the continuous measurement is not executed, the process proceeds to S508.

(FIG. 5: S504)

The control unit 20 determines whether or not the electromotive force of the first specimen is greater than a predetermined value. This step is to determine whether or not the electrolyte concentration included in the first specimen has influence on the measurement result of the second specimen. When the electromotive force of the first specimen is greater than the predetermined value, the process proceeds to S505. When the electromotive force of the first specimen is less than or equal to the predetermined value, the process proceeds to S508.

(FIG. 5: S504: Supplement)

The predetermined value used for the determination in this step can be determined based on, for example, EMF data corresponding to the specimen concentration collected at the time of manufacturing. Alternatively, a value obtained by adding an appropriate value to an EMF value acquired by the ISa measurement may be used. In addition, the predetermined value can also be calculated according to the calibration result executed before the ISa measurement.

(FIGS. 5: S505 to S507)

As in S205 to S207, the control unit 20 measures (S507) the second specimen after measuring the internal standard solution twice (S505 and S506).

(FIGS. 5: S508 to S509)

As in S210 and S211, the control unit 20 measures Isa (S508) and the second specimen (S509).

Third Embodiment 3

Figure 6:
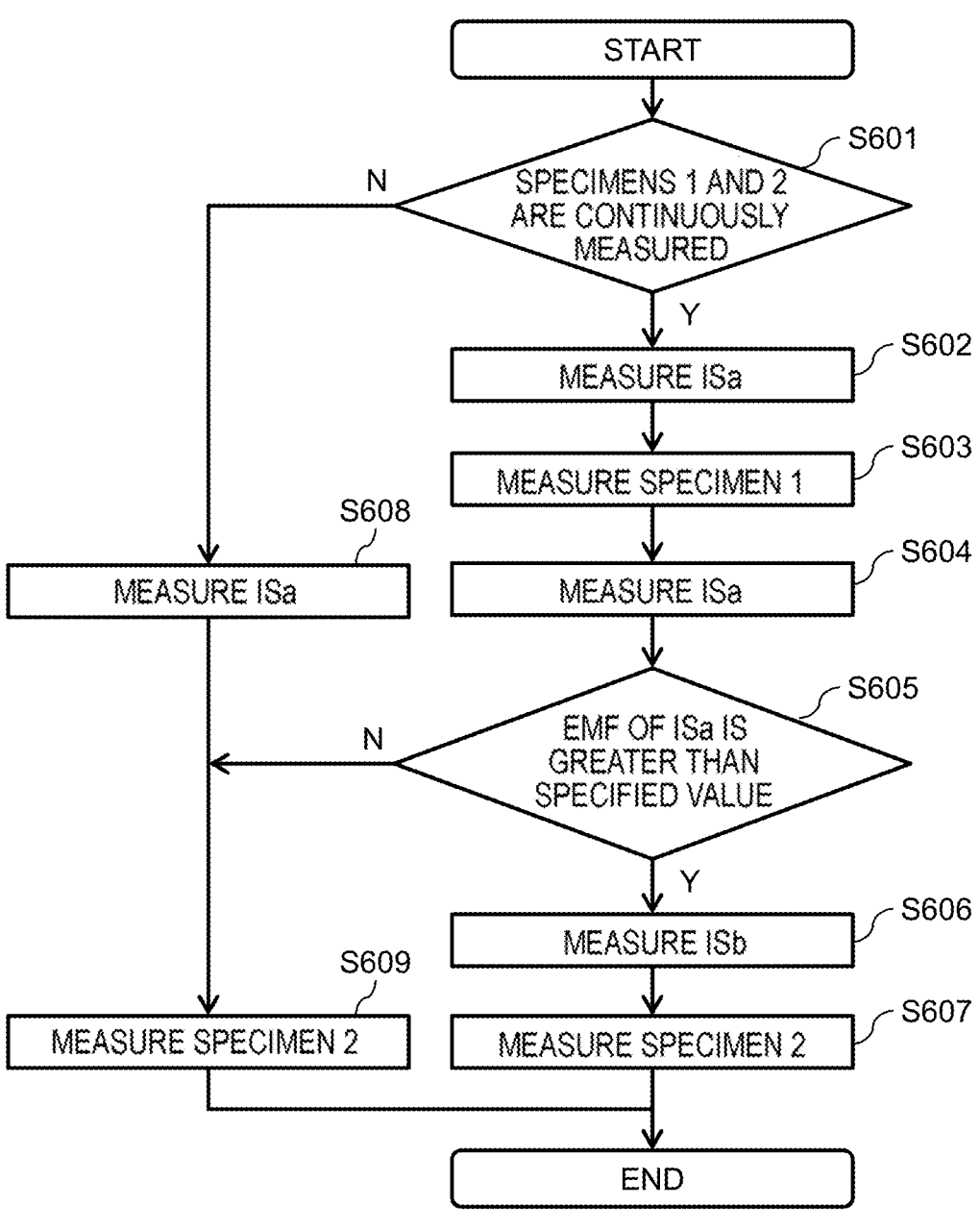
FIG. 6 is a flow chart illustrating an operation procedure of the automatic analysis device 100 according to a third embodiment.

FIG. 6 is a flow chart illustrating an operation procedure of the automatic analysis device 100 according to the third embodiment. The third embodiment is different from the first and second embodiments except for the method of determining whether or not the first specimen has a large influence on the measurement result of the second specimen. The configuration of the automatic analysis device 100 is the same as that of the first embodiment. Hereinafter, each of steps in FIG. 6 will be described.

(FIGS. 6: S601 to S604)

S601 to S603 are the same as S501 to S503. The control unit 20 supplies the internal standard solution ISa to the ISE electrode 10 and measures the electrolyte concentration (S604).

(FIG. 6: S605)

The control unit 20 determines whether or not the electromotive force of ISa is greater than a predetermined value. For example, this determination can be executed based on whether or not the difference between the ISa electromotive force in S602 and the ISa electromotive force in S604 is greater than an allowable difference value defined in advance at the time of manufacturing. This step is significant in that the degree of influence of the first specimen can be determined. When the electromotive force of ISa is greater than the defined value, the process proceeds to S606. When the electromotive force of ISa is less than or equal to the defined value, the process proceeds to S609.

(FIG. 6: S605: Supplement)

At the time of this step, the first internal standard solution Isa is already measured. Therefore, it is only necessary that the twice internal standard solution ISb is measured after S606. Likewise, when "N" is determined in this step, it is not necessary to execute S608 after this step. Therefore, the process proceeds to S609.

(FIGS. 6: S606 to S609)

As in S506 to S509, the control unit 20 measures the internal standard solutions ISa and ISb and the second specimen.

Fourth Embodiment

Figure 7:
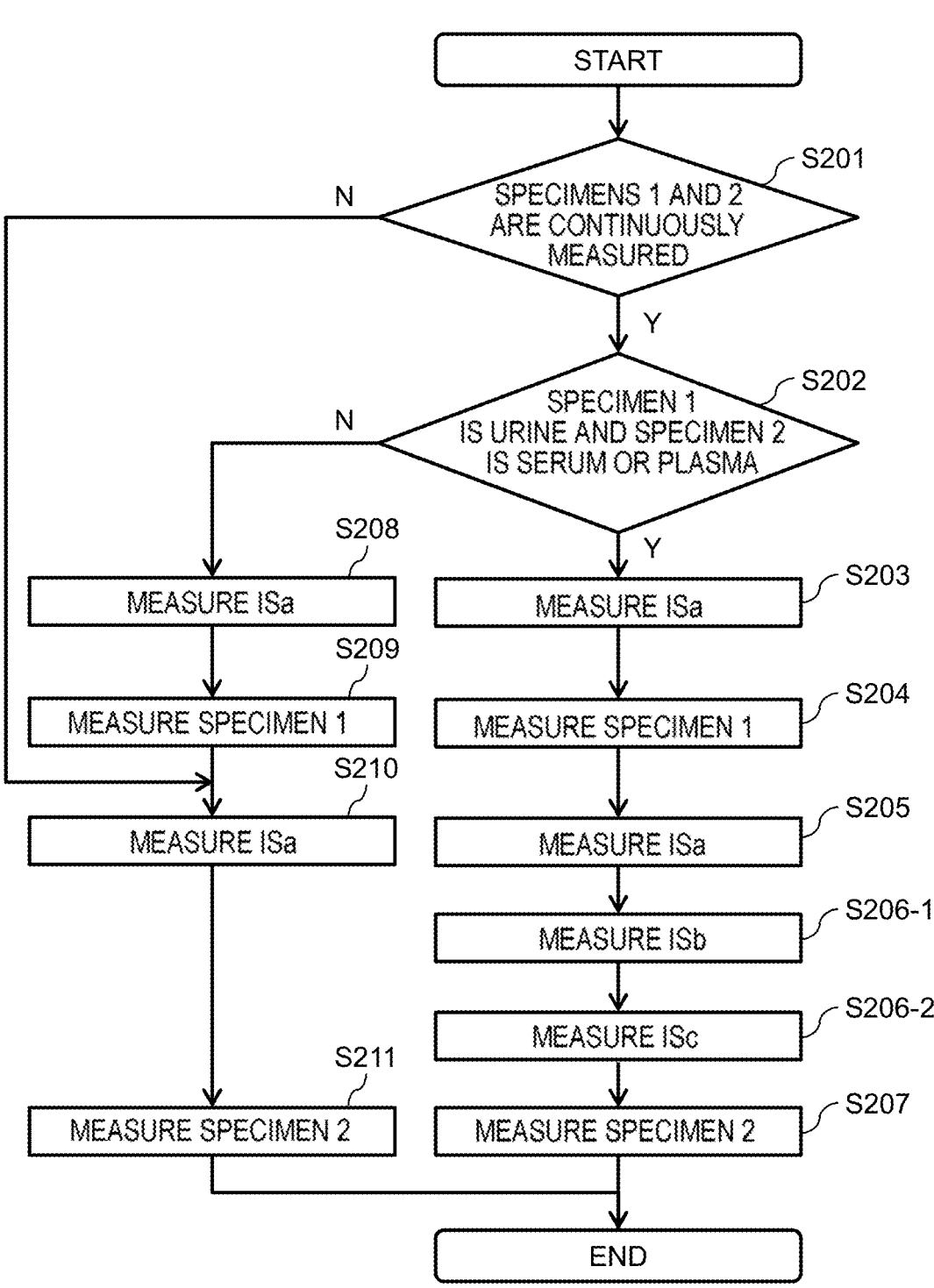
FIG. 7 is a flow chart illustrating an operation procedure of the automatic analysis device 100 according to a fourth embodiment.

FIG. 7 is a flow chart illustrating an operation procedure of the automatic analysis device 100 according to the fourth embodiment. As the specimen type, in addition to serum, plasma, and urine, a liquid or a secretion such as whole blood, cerebrospinal fluid, sputum, pleural effusion, ascitic fluid, or buccal secretion may also be used. The concentration, the supply amount, or the number of times of measurement of the internal standard solution may be adjusted according to the concentration, viscosity, foreign substances of the specimen. FIG. 7 illustrates an example of increasing the number of times of measurement by executing S206 twice. Other configurations are the same as those of the first to third embodiments.

Fifth Embodiment

Figure 8:
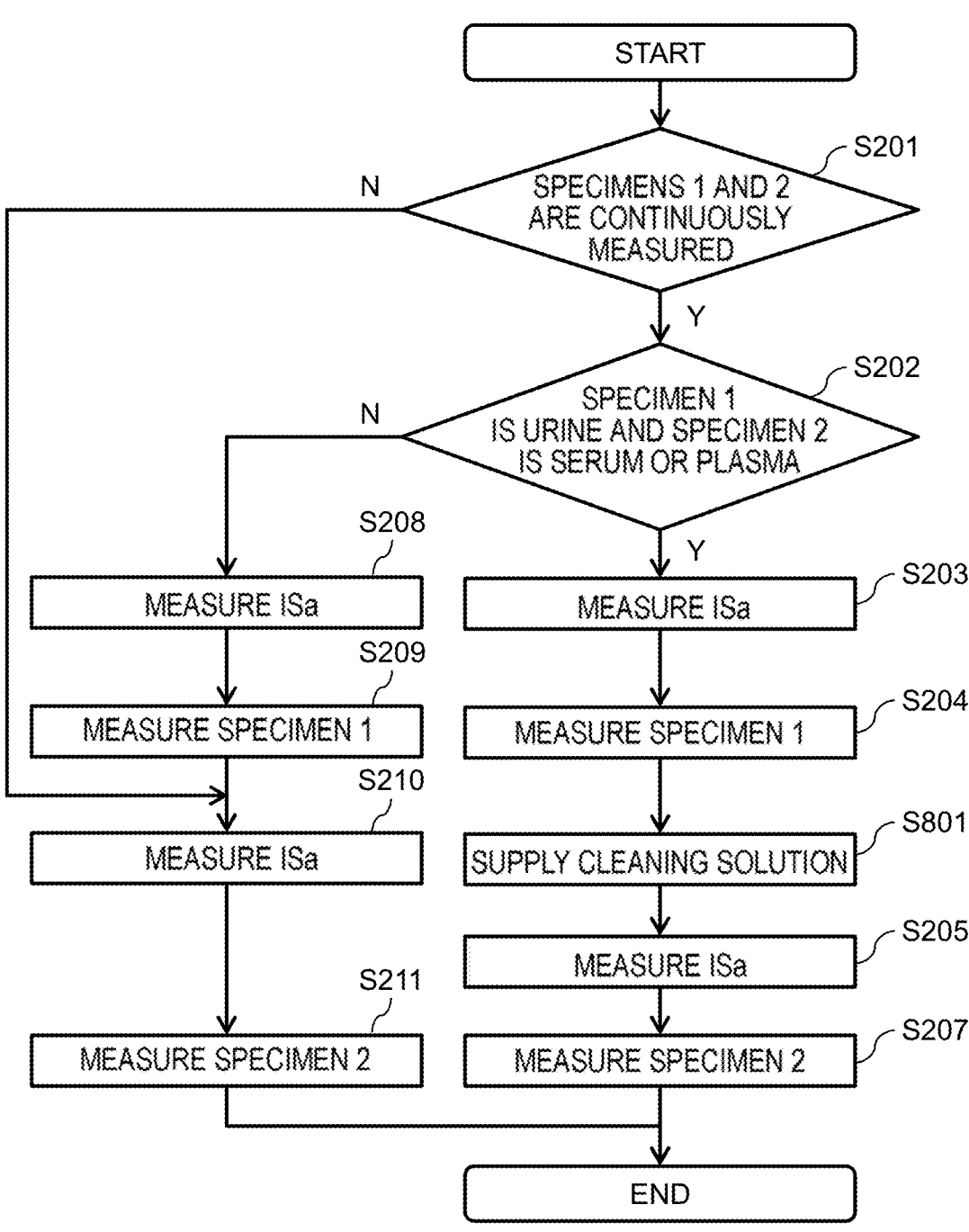
FIG. 8 is a flow chart illustrating an operation procedure of the automatic analysis device 100 according to a fifth embodiment.

FIG. 8 is a flow chart illustrating an operation procedure of the automatic analysis device 100 according to a fifth embodiment. When the first specimen has a large influence on the measurement result of the second specimen, a part of the internal standard solution to be measured multiple times can be replaced with a cleaning solution. Specifically, the internal standard solution other than the internal standard solution used for calculating the electrolyte concentration of the specimen (internal standard solution to be meaured immediately before measuring the specimen) can be replaced with the cleaning solution. In FIG. 8, by executing S801 before S205 instead of S206, the cleaning solution is supplied to the ISE electrode 10. Other configurations are the same as those of the first to third embodiments.

It is desirable that the cleaning solution does not include a surfactant or a highly lipophilic component due to the properties of the ISE electrode 10. When the first specimen is a biological sample and protein is cleaned, it is preferable that the cleaning solution includes components for promoting proteolysis such as an alkali component having pH of about 8 to 12, hypochlorite, or an enzyme. In order to avoid the influence on the measurement result of the next internal standard solution to be measured, it is desirable that the cleaning solution concentration is set such that the cleaning solution is cleaned away in the process of supplying ISa.

Regarding Modification Example of Present Invention

In the embodiments, the process corresponding to the specimen type of the first specimen and the second specimen and the process based on the actual measurement result of the electromotive force of the first specimen or the internal standard solution have been described. In the embodiments, these processes are collectively described as a process of "controlling the supply of the internal standard solution to the measurement unit based on a difference between the concentration of the target ions included in the first specimen and the concentration of target ions included in the internal standard solution or the second specimen". In the former case, there may be a case where the concentration difference between the first specimen and the second specimen is not substantially present, but when the first specimen is urine and the second specimen is serum and/or plasma, mostly, the concentration difference between the first specimen and the second specimen is large. In addition, in the latter case, with reference to the actual determination result, the difference between the concentration of target ions included in the first specimen and the concentration of target ions included in the internal standard solution or the second specimen can be estimated.

In the description of the above-described embodiments, the urine specimen is used as the example of the first specimen, and the serum specimen or the plasma specimen is used as the example of the second specimen. However, the present invention is not limited to these examples, and is generally applicable to a case where the first specimen has influence on the measurement result of the second specimen. In addition, the ion species to be detected by the ISE electrode 10 is not limited to Cl/K/Na, and the present invention is applicable to all the ion species.

REFERENCE SIGNS LIST

1: Sample probe
2: Sample container
3: Dilution tank
4: Dilution nozzle
5: Diluent syringe
6: Dilution bottle
7: Degassing mechanism
8: Sipper syringe
9: Electromagnetic valve
10: ISE electrode
11: Pinch valve
12: Reference electrode solution bottle
13: Reference electrode
14: Voltmeter
15: Amplifier
16: Internal standard solution bottle
17: Internal standard solution syringe
18: Internal standard solution nozzle
19: Calculator
20: Control unit
21: Computer
22: Storage unit

The invention claimed is:

1. An automatic analysis device comprising:

a measurement unit, which includes an ion selective electrode (ISE) and a calculator, configured to measure a concentration of target ions included in a first specimen, which is urine, a second specimen, which is serum or plasma, and an internal standard solution;

a liquid supply unit configured to supply the first specimen, the second specimen and the internal standard solution to a dilution tank; and a control unit, coupled to the measurement unit and the liquid supply unit, configured to:

calculate a measurement result of a concentration of the target ions included in the first specimen and the second specimen by using the measurement result of the concentration of the target ions included in the internal standard solution, execute a first preparation operation for the measurement of the concentration of the target ions included in a first supply of the internal standard solution while the measurement unit executes a first measurement operation which measures the concentration of the target ions included in the first specimen, the first preparation operation including controlling the liquid supply unit to supply the first supply of the internal standard solution to the dilution tank, execute a second preparation operation for the measurement of the concentration of the target ions included in the second specimen while the measurement unit executes a second measurement operation which measures the concentration of the target ions included in a second supply of the internal standard solution, the second preparation operation including controlling the liquid supply unit to supply the second specimen to the dilution tank, and execute a third preparation operation for the measurement of the concentration of the target ions included in the second supply of the internal standard solution while the measurement unit executes a third measurement operation which measures the concentration of the target ions included in the first supply of the internal standard solution, wherein the third preparation operation includes controlling the liquid supply unit so as to supply the second supply of the internal standard solution to the dilution tank before beginning the second preparation operation for the measurement of the concentration of the target ions included in the second specimen.

2. The automatic analysis device according to claim 1, wherein the control unit is configured determine whether a difference in concentrations between the first specimen or the second specimen and the internal standard solution is greater than a specified value based on a difference in electromotive force between the first specimen or the second specimen and the internal standard solution, which is calculated by a measurement of the measurement unit.

3. The automatic analysis device according to claim 1, wherein when the measurement result of the concentration of the target ions included in the first specimen is greater than a predetermined value, the control unit determines that the concentration of target ions included in the first specimen is greater than the concentration of target ions included in the internal standard solution by a reference value or greater.

*     *     *     *     *